United States Patent
Moon et al.

(10) Patent No.: US 6,211,858 B1
(45) Date of Patent: *Apr. 3, 2001

(54) METHOD AND APPARATUS FOR DISPLAYING A ROTATING METER ICON ON A PORTABLE INTELLIGENT COMMUNICATIONS DEVICE

(75) Inventors: Billy G. Moon, Apex; Brian Bankler, Cary, both of NC (US)

(73) Assignee: Ericsson Inc., Research Triangle Park, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,102

(22) Filed: Sep. 26, 1997

(51) Int. Cl.[7] ............................. G09G 5/08; G09G 5/00; H04G 7/20
(52) U.S. Cl. ......................... 345/146; 345/173; 345/179; 455/566
(58) Field of Search .............................. 345/173, 179, 345/352, 353, 146; 379/433, 428, 96, 102; 455/566, 572, 558, 556; 340/825

(56) References Cited

U.S. PATENT DOCUMENTS

| | | | |
|---|---|---|---|
| 5,239,684 | * 8/1993 | Ishikura | 455/67.7 |
| 5,396,264 | * 3/1995 | Falcone et al. | 345/146 |
| 5,420,975 | * 5/1995 | Blades et al. | 345/334 |
| 5,422,656 | * 6/1995 | Allard et al. | 455/556 |
| 5,634,100 | * 5/1997 | Capps | 345/340 |
| 5,689,654 | * 11/1997 | Kikinis et al. | 455/575 |
| 5,821,936 | * 10/1998 | Shaffer et al. | 345/352 |
| 5,848,356 | * 12/1998 | Jambhekar et al. | 379/93.23 |
| 6,144,863 | * 11/2000 | Charron | 455/566 |

* cited by examiner

*Primary Examiner*—Matthew Luu
*Assistant Examiner*—Anthony J. Blackman
(74) *Attorney, Agent, or Firm*—Davidson & Gribbell, LLP

(57) ABSTRACT

A portable intelligent communications device is provided which includes a cellular telephone and a computer-controlled touch screen display. The touch screen display is a high-resolution graphics display which acts as a graphical user interface. The touch screen display is provided with an area that displays various informative meter icons that sequentially switches from one icon to the next. This is very desirable since the touch screen display is rather small in size, and there may not be enough space to simultaneously show the user all the information required by various meters. Standard meters include: battery power, signal strength, print status, status of messages, and the like. The switching or "rotating" meters are controlled by a user selectable timetable, and one of the meters can take a higher priority in situations where the value displayed by the meter has changed state. In addition, the area around the rotating meter could be flashed with new information when something out of the ordinary occurs, such as a "New Mail" alert.

22 Claims, 7 Drawing Sheets

METHOD AND APPARATUS FOR DISPLAYING A ROTATING METER ICON ON A PORTABLE INTELLIGENT COMMUNICATIONS DEVICE

BACKGROUND OF THE INVENTION

1. Field of the Invention

The present invention relates generally to mobile communications equipment and is particularly directed to a cellular telephone of the type which includes a computer-controlled graphics display. The invention is specifically disclosed as a portable intelligent communications device that has a touch screen display in which the graphics user interface displays a switching meter icon at a given area on the display, and the switching or "rotating" meter displays various symbols that each represent information related to system performance of the portable intelligent communications device.

2. Description of Related Art

Various types of portable laptop computers have been available for many years, and their flat panel displays typically run in a Windows™ environment as the graphics user interface. Windows-compatible computer programs that execute on laptop computers typically use pull-down menus so the user can select from various choices to operate the executing program, and many times choices will be presented to the user using a drop down list in which the user can type in certain information, such as operating parameters or filenames. Windows-compatible displays frequently include one or more informative "meters" to indicate various system operating parameters, such as "battery life" (i.e., battery power remaining) or "print status," and the like. In a complex computer system, displaying all of the informative meters of interest to the user at one time may require an inordinate amount of display real estate, especially for portable computers with limited display sizes, such as in laptop computers. For portable computers having case sizes even smaller than laptop computers, the relatively small size of the associated graphics display will require some changes to the "normal" method of displaying system performance information.

Portable telephones, particularly cellular telephones, have also been available for years. Most such equipment is computer controlled, in which the cellular phone includes a microprocessor or other processing control unit, along with sufficient random access memory to store some of the parameters that can be selected by the phone's user. Some telephones include a relatively small liquid crystal display which can show various types of information, including the telephone number being dialed, and/or the telephone number of a call being received. Such displays are typically limited to alphanumeric characters, and do not lend themselves well to displaying graphical data or images.

It would be desirable to provide a portable telephone with a high-resolution graphics display in order to make better use of the processing power that is available when including a microprocessor within the portable telephone. Such a device could be configured to run computer programs that are comparable to Windows-type software in the form of word processors, spreadsheets, and other communications software such as a web browser.

SUMMARY OF THE INVENTION

Accordingly, it is a primary object of the present invention to provide a portable intelligent communications device that has the capability of acting as a cellular telephone and as a laptop computer.

It is another object of the present invention to provide a portable intelligent communications device that includes a cellular telephone and a high-resolution graphics display screen in which various information meter icons are sequentially displayed.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved portable intelligent communications device is provided which includes a portable or cellular telephone and a computer-controlled touch screen display. The touch screen display is a high-resolution graphics display, and while it is smaller in size than a standard laptop computer display, the touch screen display of the present invention acts as a graphical user interface in which various executable computer programs can be accessed and executed on the portable intelligent communications device. A microprocessor controls the graphics display, and also controls a modem that communicates with the transmitter/receiver portion of the cellular telephone. Under control of the microprocessor, the portable intelligent communications device can communicate over the Internet by use of a web browser program resident in the portable intelligent communications device.

Since the touch screen graphics display is smaller in size than a standard laptop computer's display, the area used for displaying information is at a premium, including the portion of the display that illustrates informative meters. Consequently, the display of the personal business communicator is provided with an area that displays various informative meter icons that sequentially switch or "rotate" from one icon to the next. This is very desirable since the touch screen display is rather small in size, and there may not be enough space to show the user all the information required by various meters. In the present invention, the word "meter" is defined as a "small" application program that constantly monitors the system in the background (or checks the system periodically) and displays the information graphically. Standard meters include: battery power, signal strength, print status, status of messages, handset out of range indicator, types of hardware status messages (e.g., PCMCIA slot usage, infrared connections), and the like. The rotating meters are controlled by a user selectable timetable, and one of the meters can take a higher priority in situations where the value displayed by the meter has changed state. In addition, the area around the rotating meter could be flashed with new information when something out of the ordinary occurs, such as a "New Mail" alert.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
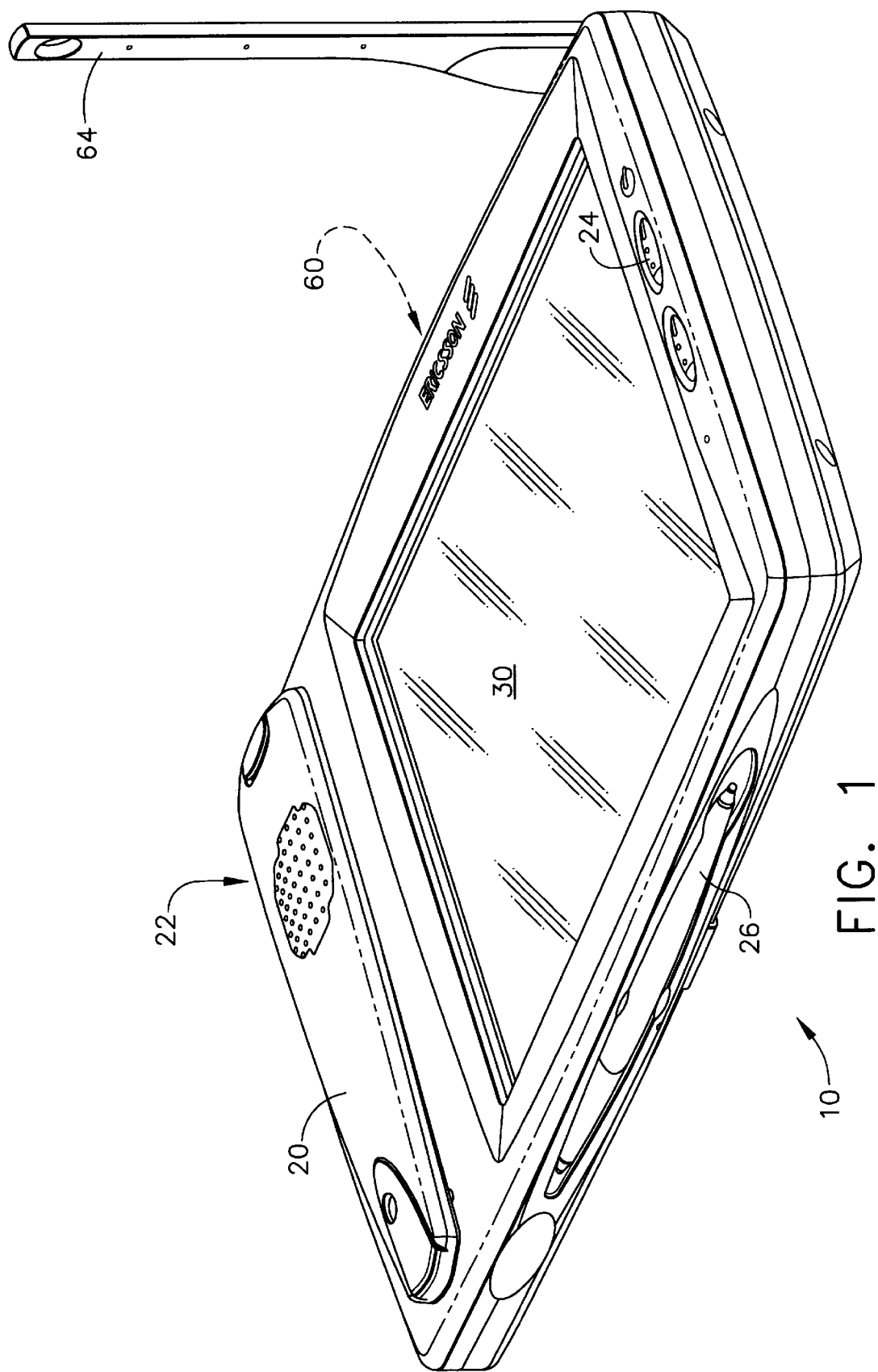
FIG. 1 is a right-hand, frontal perspective view of a portable intelligent communications device, as constructed according to the principles of the present invention.

Referring now to the drawings, FIG. 1 shows a portable intelligent communications device generally depicted by the reference numeral 10. Some of the major components include a telephone handset 20, a speaker 22, optional control buttons 24, an optional stylus 26, and a touch screen display 30. Along the far side of portable intelligent communications device 10 is an antenna 64, and various plug-in ports (not shown), including optional personal computer card ports, an optional keyboard port, and an optional telephone land-line connector (depicted in dashed lines at 60). Portable intelligent communications device 10 preferably is no larger than a standard business desk telephone, and the touch screen display 30 is preferably a rectangular display having a pixel density of at least 640 by 480 pixels, and a size of around eight (8) inches across its diagonal.

Figure 2:
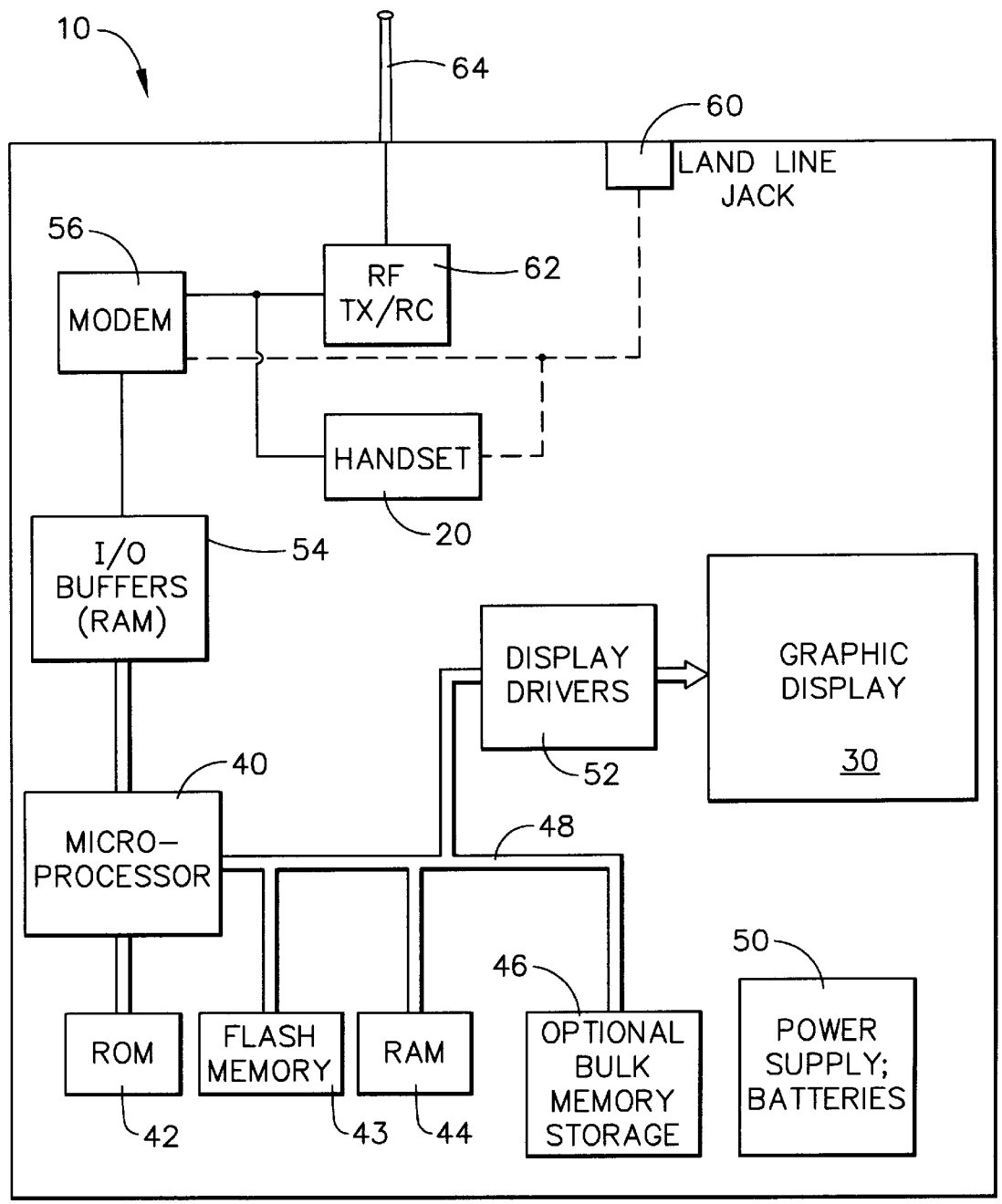
FIG. 2 is a block diagram of the major components of the portable intelligent communications device of FIG. 1.

In FIG. 2, the major components of the portable intelligent communications device 10 are depicted in a block diagram format. A microprocessor 40 preferably is provided in the portable intelligent communications device to control the various operations of the data being transferred into or out of the portable intelligent communications device, and to control the graphic display 30. As in most computer-based systems, microprocessor 40 will communicate with other components over a bus system 48, which typically includes address lines, data lines, and control lines. Bus system 48 connects microprocessor 40 to read only memory (ROM) 42, user changeable non-volatile "flash" memory (e.g., an EPROM circuit) 43, random access memory (RAM) 44, and an optional bulk memory storage device 46, such as a hard disk drive. A power supply 50 is also provided, which typically would be energized by batteries. Microprocessor 40 is also connected to a display driver circuit 52, which controls the images that are emitted by the graphic display 30.

Microprocessor 40 communicates with a set of input/output buffers 54, which may be separate hardware components, or may be part of the main system RAM 44. The I/O buffers 54 are connected to a modem 56, which in turn is connected to the handset 20. Modem 56 is also optionally connected to a land line connection (e.g., via land line jack 60), which would enable the portable intelligent communications device 10 to directly be plugged into a telephone line via a wall jack. Modem 56 is also connected via a matrix switch (not shown) to a radio frequency transmitter/receiver unit 62, which in turn is connected to antenna 64. An exemplary portable intelligent communications device is disclosed in a co-pending patent application entitled, "Switching of Analog Signals in Mobile Computing Devices," and having the Ser. No. 08/796,119, which is owned by the assignee of the present invention, and hereby is incorporated by reference herein.

As will be understood by one of ordinary skill in the art, portable intelligent communications device 10 can be configured to act as a very powerful and versatile piece of communications equipment, and with the proper software, also can act as a portable computer having a flat-panel display. With sufficient RAM and a medium-size hard disk drive, the portable intelligent communications device 10 could act as a Windows-based personal computer platform, and could run the standard Windows-based computer programs, such as Microsoft WordT™. However, since the graphic display 30 is physically smaller than most monitor screens that are provided with personal computers or laptop computers, the standard Windows-based computer programs and graphical user interface systems may not be easily used without some modifications.

Figure 3:
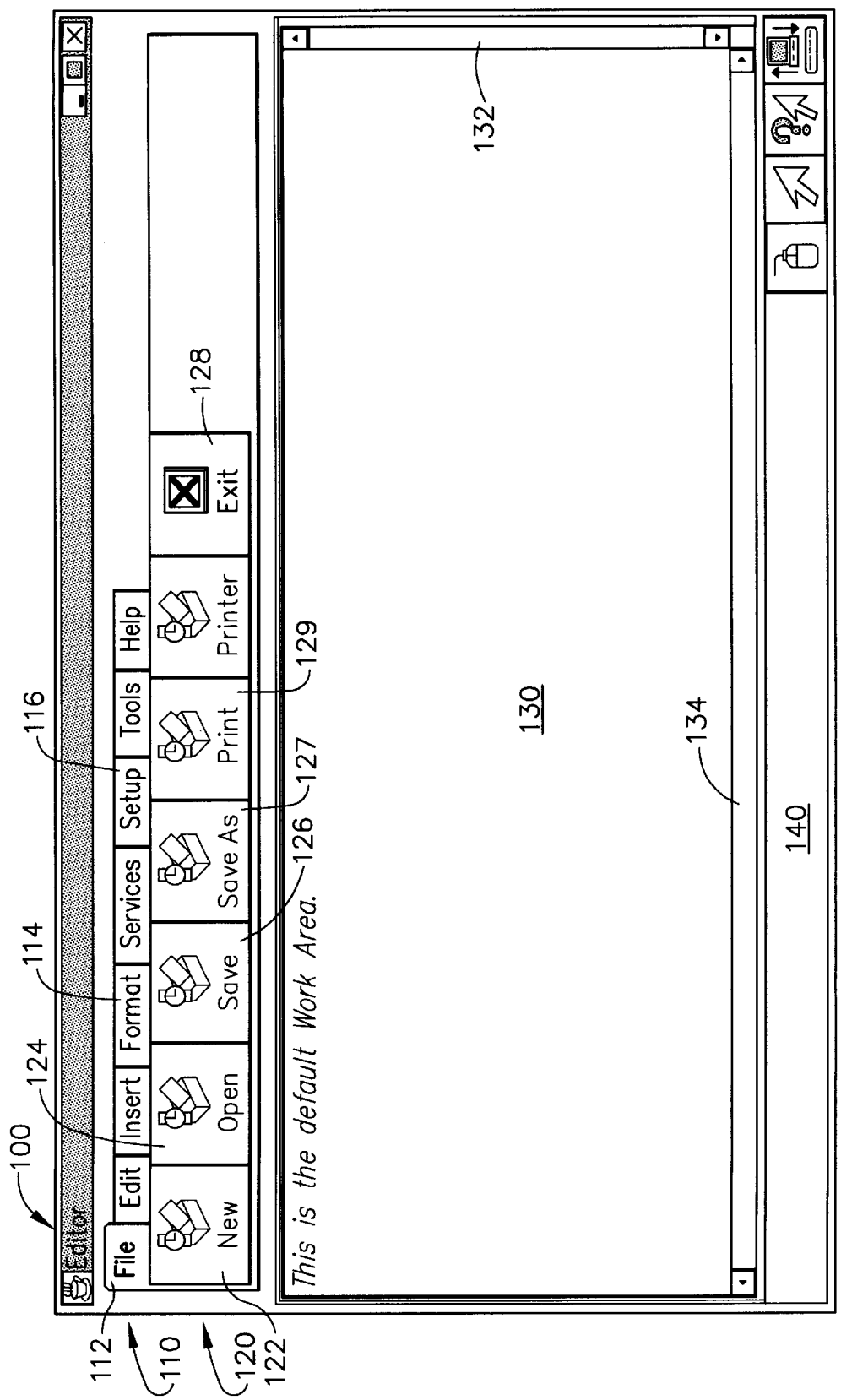
FIG. 3 depicts a graphical user interface display provided with the portable intelligent communications device of FIG. 1, showing some of the tabbed panel menu areas and a work area with no docking dialog.

In the present invention, the menu choices for the graphical user interface are provided with a windowing-type environment, which can be achieved through a docking of dialogs, information boxes and keyboard symbols. This will drastically reduce clutter and confusion for the user when using the portable intelligent communications device's windowing environment. For example, FIG. 3 depicts a graphical user interface (not to scale) preferably provided with portable intelligent communications device 10, which in this example acts as a text editor or word processor. The title of the computer program, "Editor," is located in the top window title bar at reference numeral 100, just like in other standard Windows-based application programs. The standard control buttons are also located along the right-hand side of this top window title bar.

The main control panel is depicted at reference numeral 110, as a tab area having a series of tabbed selections, such as "File" at 112, "Format" at 114, and "Setup" at 116, as some of the choices. Options displayed in this manner will be referred to hereinbelow as "tab control panels," or as a "tab menu area."

After one of the tabs has been selected by the user, a second level of menu choices, known as "dialogs" will now appear on the display, as seen at reference numeral 120. As used herein, the term "dialog" does not necessarily refer to a pop-up display, but could instead be docked somewhere else within existing windows. In the example display of FIG. 3, the user has selected the "File" tab at 112, which brings forth the second level menu choices, such as "New" at 122, "Open" at 124, "Save" at 126, etc., finally ending with a dialog called "Exit" at 128. As will be understood by one of ordinary skill in the art, these dialogs provide the same functions as pull-down menu choices that appear on a standard Windows-based word processing program, which provides menu choices, such as "File."

A "work area" at reference numeral 130 is provided which, in the case of a word processor or text editor, would include the image of a document that is being created or edited. As in most word processing computer programs, the size of the "window" that shows the actual contents of the document being edited is much too small to display the entire document at one time. Consequently, there is a vertical scroll bar at 132, and a horizontal scroll bar at 134. These scroll bars operate in the same manner as the equivalent vertical and horizontal controls for a Windows-based word processing program. The bottom rectangular area at reference numeral 140 will preferably be used to display status information.

Another advantage of the portable intelligent communications device of the present invention is that its graphical user interface is designed to be operated by touch-navigation, meaning that the human finger can be placed directly on the menu item choice of interest, which will have an identical effect as if a mouse or other pointing device were used to make the menu selection choice. The shape and size of the control buttons and the tabs are such that a human finger can select the appropriate control button (or tab) without flowing over onto an adjacent control button. Since the relatively small size of the graphic display 30 will not allow as large a menu set of choices as a standard laptop computer's display, the graphical user interface of the present invention must be intelligently designed to provide the appropriate controls and options while still having these controls spaced appropriately for finger navigation. While finger navigation is the preferred mode of operation for portable intelligent communications device 10, a stylus or light pen 26 may optionally be provided so that a user may make selections on display 30 with somewhat greater accuracy, if desired.

FIG. 5 again illustrates the Editor application 100, which includes a tab menu area 110 and a set of image buttons at 120. The work area is depicted at 130. Various types of information are displayed using icons and other symbols on the status bar 140, such as a mailbox that raises a flag if new E-mail has arrived. On a portable device having a small display screen, however, there may not be enough area to show the user all of the information required by various informative meters. The use herein of the word "meter" represents a "small" application program that constantly monitors the computer system in the background (or checks the system periodically), and displays the information graphically. The relatively small meter area, designated by reference numeral 450, represents a sequencing or "rotating" meter that causes a single area on the overall display screen to act as a "super meter." The super meter operates to provide various status displays that sequentially switch from one symbol to another symbol in the same area (i.e., at 450). Standard meters are depicted to indicate such information as battery power, signal strength, print status, status of messages, handset out of range indicator, types of hardware status messages (e.g., PCMCIA slot usage, infrared connections), and other similar functions. The super meter "rotates" automatically between the various types of meters that are to be displayed.

Of course, one of the rotating meters may obtain priority in the event of a change in state, such as some type of error condition. For example, if the battery power of the portable intelligent communications device falls to a certain critical level, then rotating meter 450 may show the battery power meter more often, or alternatively may show the same rotation sequence, except that the battery signal will be enhanced by a background color to catch the user's attention more easily. Since the meters are aware of the fact that they are in a sequencing or rotating meter cue, they can "ask" to be immediately displayed if they have changed state. Another way to obtain the user's attention more readily is by flashing the area surrounding the rotating meter at appropriate times, and/or by issuing an audible "bell" signal.

Figure 5:
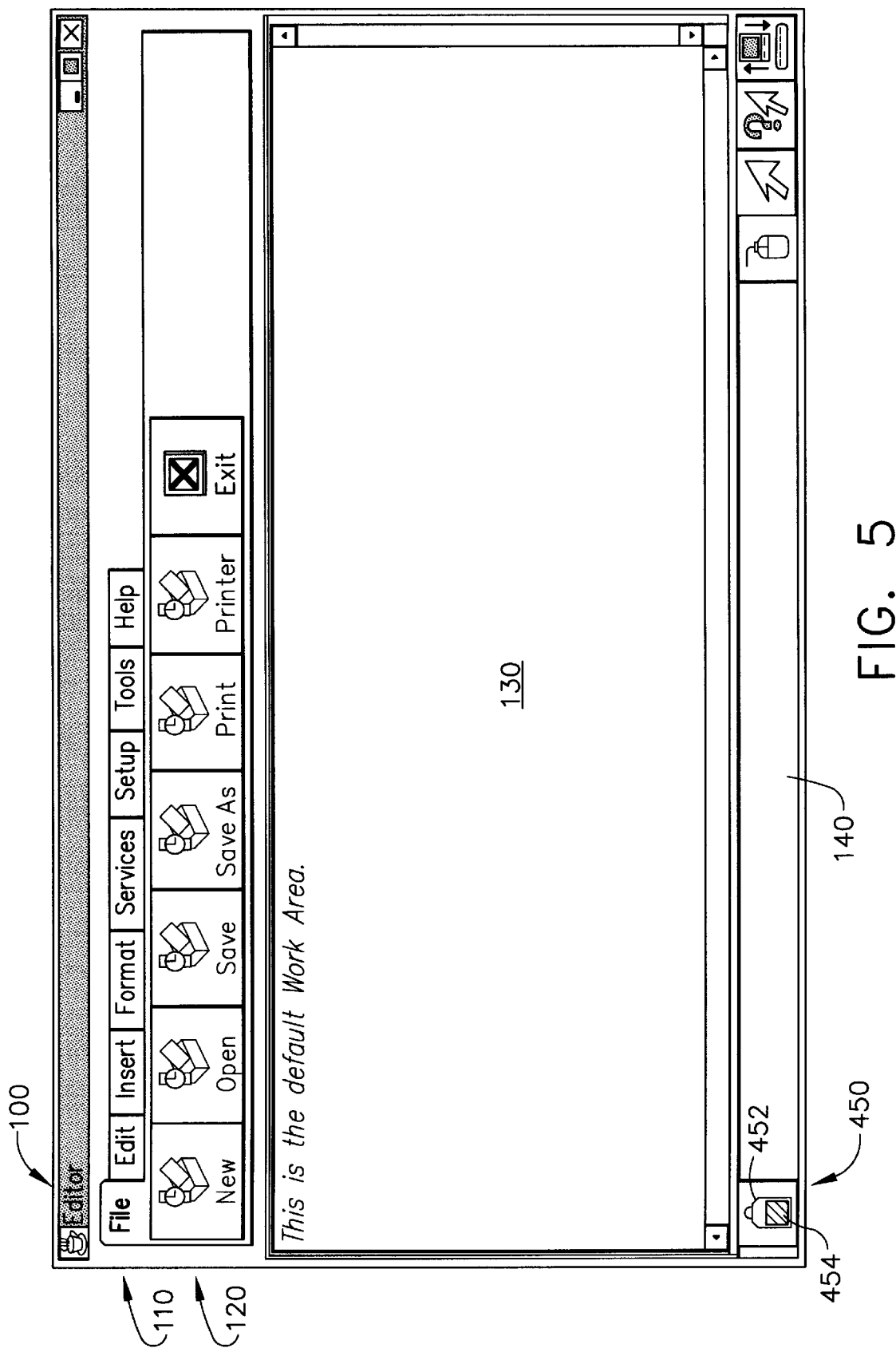
FIG. 5 depicts a graphical user interface display provided with the portable intelligent communications device of FIG. 1, in which a rotating informative meter icon is displayed in the status bar.

In the illustrated example of FIG. 5, the meter icon represents a battery power indicator for the portable intelligent communications device 10. The symbol at 452 generally resembles a battery, and a bar graph at 454 indicates the amount of charge remaining in the batteries that power the portable intelligent communications device. This informative meter icon 450 is depicted in its preferred location, i.e., along the left-hand side of status bar 140.

Figure 6:
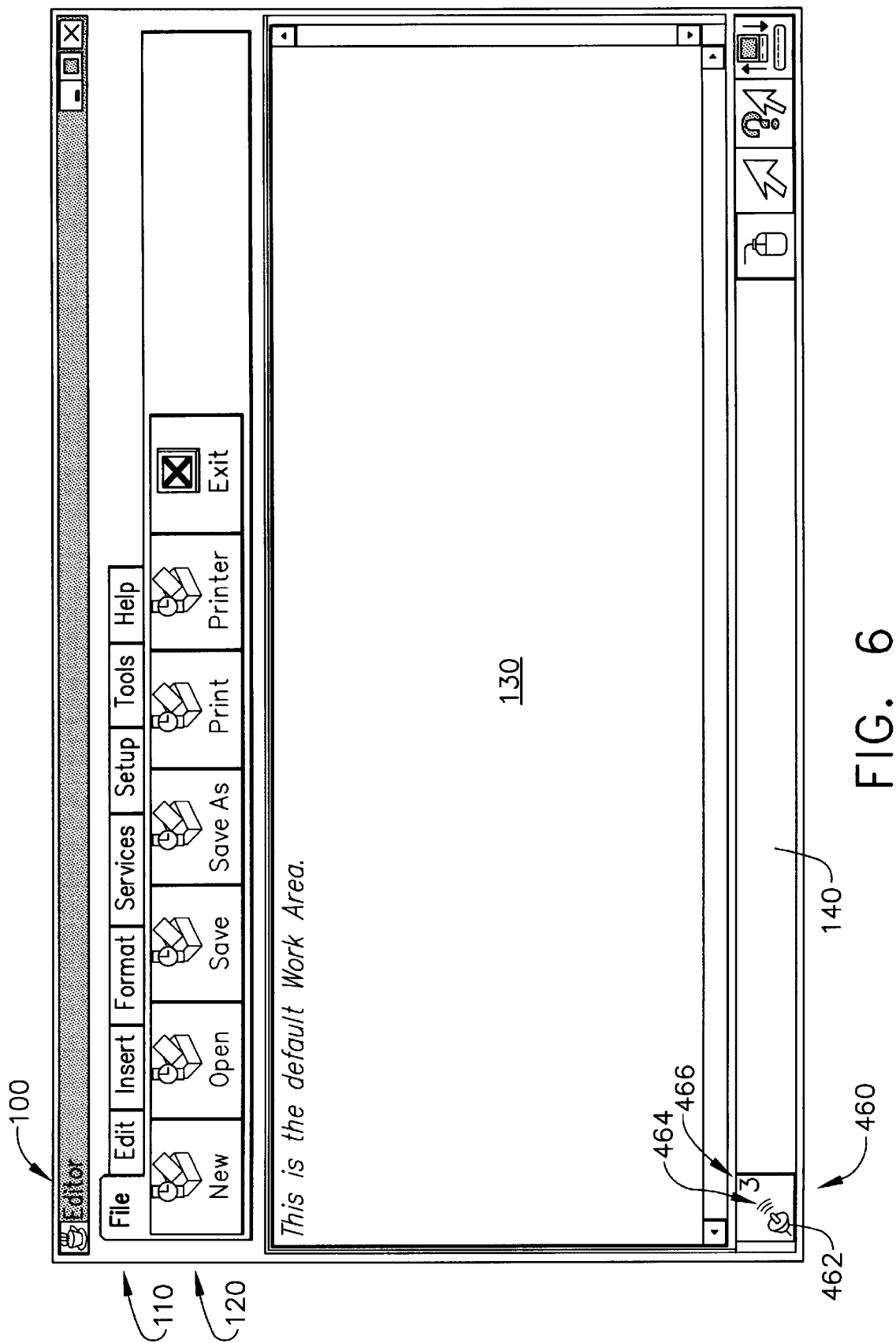
FIG. 6 depicts a graphical user interface display provided with the portable intelligent communications device of FIG. 1, in which a different rotating meter icon is displayed in the status bar.

FIG. 6 illustrates the same Editor display screen, however, the status bar 140 now shows a different meter icon at 460. The former battery power icon 450 has rotated off of the screen for now, and has been replaced by a signal strength meter 460. The symbol 462 generally illustrates an antenna dish, and the signal strength is indicated by a number and symbol. In the illustrated example, the signal strength can be portrayed in increments between zero (0) and five (5). On FIG. 6, the symbol at 464 indicates three (3) bars, and the numeric symbol at 466 also indicates the number "three." Of course, the numeric and bar symbols can vary anywhere between zero (0) and five (5).

It is preferred to have the meters rotate to save enough area so that other status information can be shown in the other spaces of status bar 140. The meters can alternate or sequence automatically at intervals, such as once every five (5) seconds. In addition, if there is a change of state in one of the meters, that meter can be highlighted by flashing its background when its turn to be displayed arrives, or it can also be displayed immediately, especially if there is any type of error or alarm state that the portable intelligent communications device 10 wishes. to bring to the user's attention. It will be understood that there could be a rotating meter at one location in the status bar, while other locations of the status bar could display fixed meters that never leave the screen. Furthermore, more than one rotating meter could be displayed at different locations along status bar 140 without departing from the principles of the present invention.

The types of informative meters preferably can be configured by the user by bringing up a "Meters" customization panel on touch-screen display 30. An example of such a Meters customization panel is depicted on FIG. 7, in which several configuration "tabs" are made available at the reference numeral 300 for use by the user. One of the tabs (and the one that is currently selected by the user on FIG. 7) is titled "Meters" at 310, and another tab is titled "Launchpad" at 312.

Figure 7:
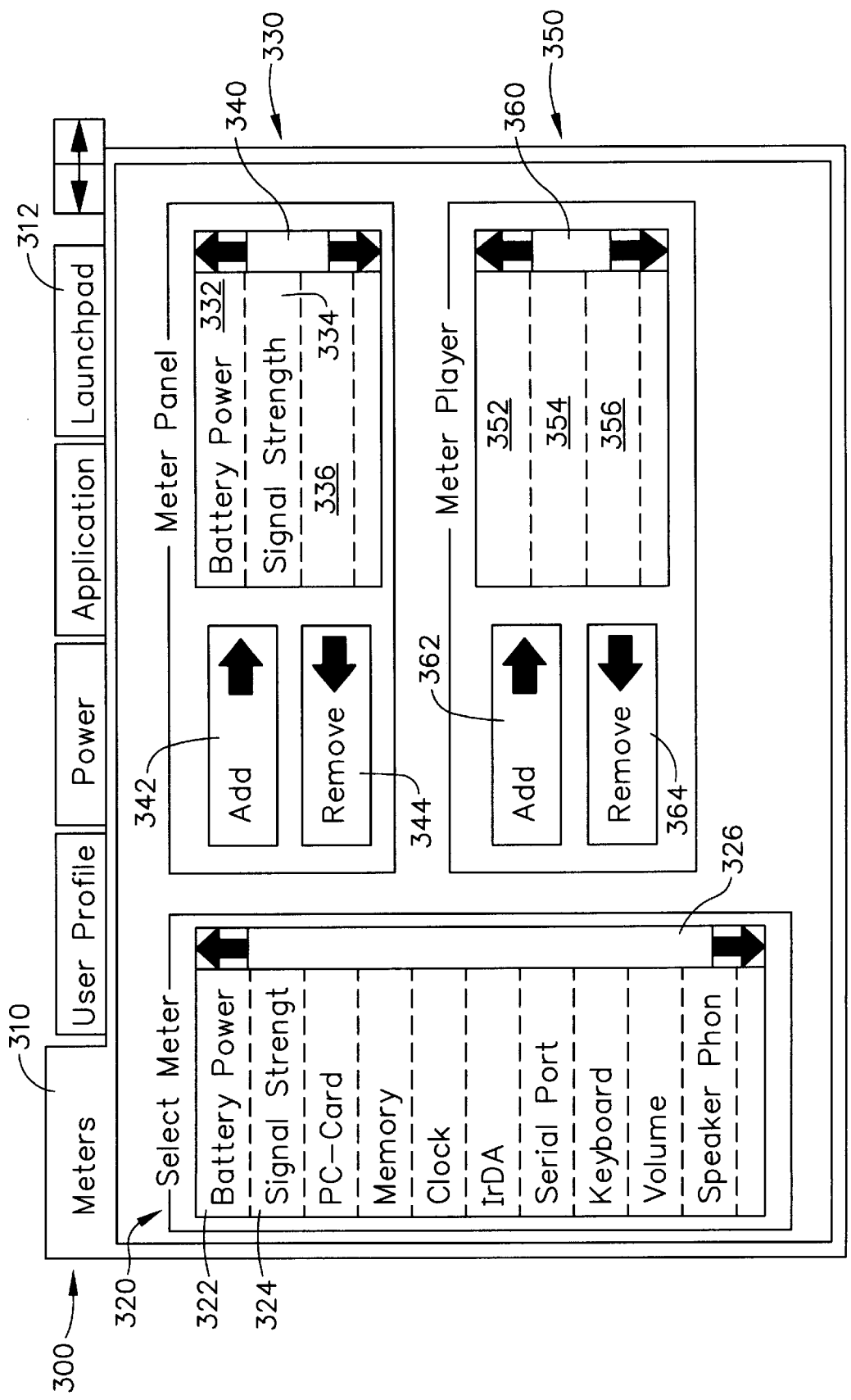
FIG. 7 depicts a graphical user interface display provided with the portable intelligent communications device of FIG. 1, which is used to configure a "fixed" meter icon and a "rotating" meter icon.

Since the Meters tab 310 has been selected on FIG. 7, a list of some of the types of informative meters that preferably are provided with portable intelligent communications device 10 is shown in a "Select Meter" box, generally depicted at the reference numeral 320. This list includes a "Battery Power" meter at 322 and a "Signal Strength" meter at 324. Other types of informative meters that preferably are provided (but which are not all depicted in the box 320) include: "PC-Card", "Memory" (i.e., memory usage), "Clock", "IrDA", "Serial Port", "Keyboard", "Volume", "Speaker Phone", "Handset", and "Messaging" (e.g., new E-mail), "Handset Out of Range" indicator, and types of hardware status messages (e.g., "PCMCIA Slot Usage", "Infrared Connection"). Certainly, further types of informative meters could be included in Select Meter box 320, and could be accessed by use of a scroll bar at 326.

Figure 4:
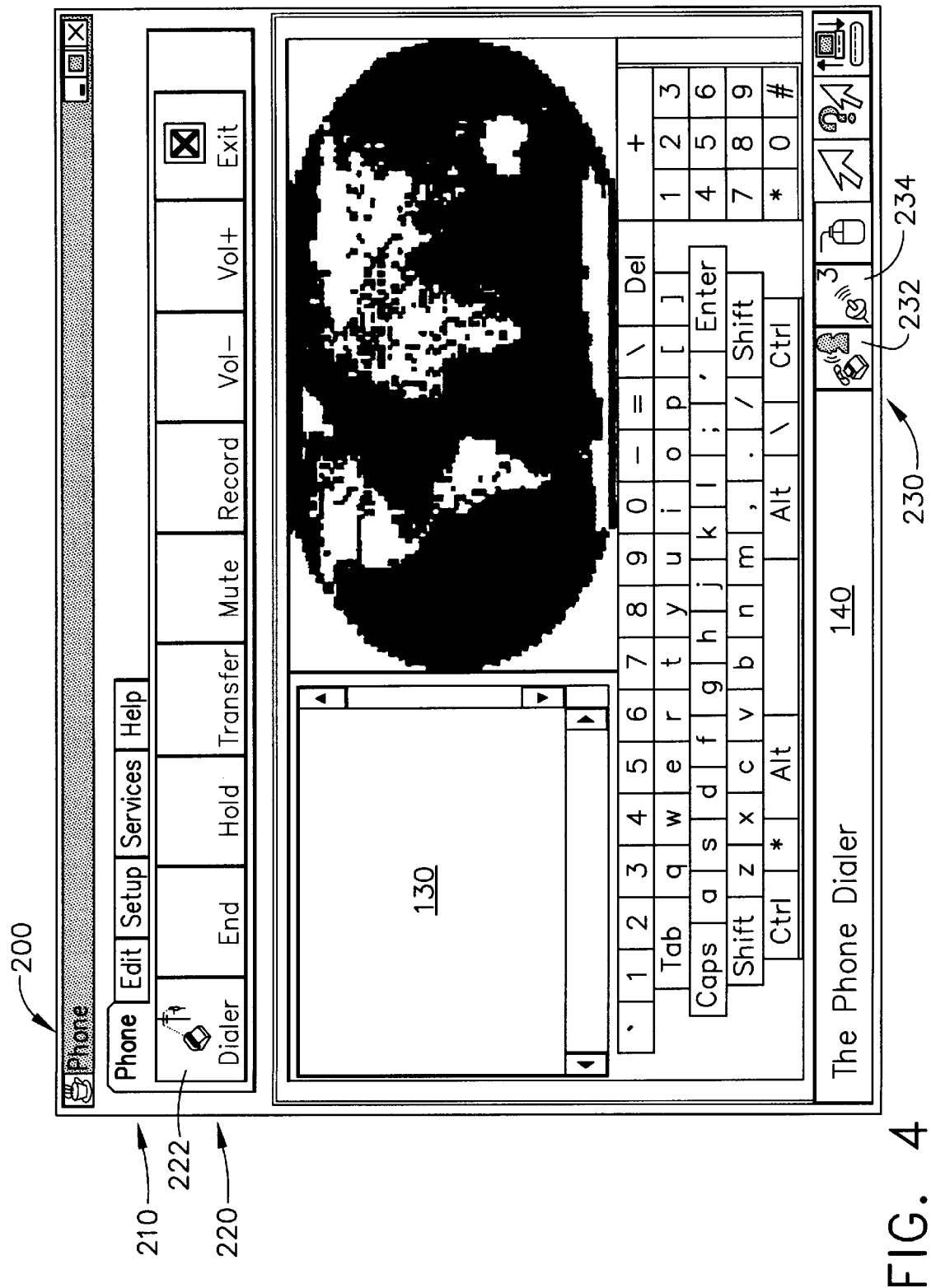
FIG. 4 depicts a graphical user interface display provided with the portable intelligent communications device of FIG. 1, in which a dialog for "saving a file" is docked on top of the work area, and in which a set of informative meter icons are displayed in the status bar.

As related hereinabove, some of the informative meters can be "fixed" and others can be "rotating." Both types of meters can be configured from the "Meters" customization panel shown on FIG. 7. Once the "Meters" tab 310 is selected from the operating systems "configuration" application, fixed meters can be added to or removed from a "Meter Panel" at 330, and rotating meters can be added to or removed from a "Meter Player" at 350. Meter types that are selected to be displayed as a "fixed" meter will be positioned along the status bar 140 and will constantly appear on the status bar, as for example, the meters 232 and 234 depicted on FIG. 4. Meter types that are selected to be displayed as a "rotating" meter also will be positioned along the status bar 140, and will appear on the status bar in a sequence of different icons, as for example, the rotating meter depicted on FIGS. 5 and 6 as a battery power meter 450 during one time interval and as a signal strength meter 460 during another time interval (both meters 450 and 460 appearing in the same position on the display 30.

Once meter icons are selected for inclusion as a rotating meter, the Meter Player function either will sequence (rotate) these meter icons so that the most important or most urgent information is being displayed most often, or at times when no particular information is more urgent than other information, the meter icons will sequence at predetermined time intervals in which each meter icon will be displayed for the same portion of the overall time period required for a complete rotation. In addition, more than a single rotating meter can be displayed simultaneously in status bar 140, while being positioned next to one another in a similar fashion as the two fixed meter icons 232 and 234 on FIG. 4.

Referring to FIG. 7, to add a fixed meter icon the user would "select" one of the meters listed in the Select Meter box at 320, then press or touch (on a touch-screen display) the "Add" button at reference numeral 342. This operation would then insert the appropriate meter name into the Meter Panel box 330, at locations, for example, such as where the Battery Power meter resides at 332 or the Signal Strength meter resides at 334. The next fixed meter to be added to status bar 140 would be placed into the presently empty (on FIG. 7) location at reference numeral 336. If more than three (3) fixed meters are to be located on status bar 140, then another "empty" position can be accessed by use of a scroll bar at 340. However, since status bar 140 cannot hold an infinite amount of fixed meter icons, it is preferable to limit the number of fixed meters that are placed in the Meter Panel, which is one important reason to assign informative meters to one of the rotating meters.

To remove one of the fixed meter icons from the status bar 140, the user would select one of the meter names in the Meter Panel box 330 (such as, e.g., the Signal Strength meter 334) and then press or touch the "Remove" button at reference numeral 344. When assigning meter icons to either the Meter Panel or the Meter Player, the user may configure the system to allow the same type of meter to appear in more than one rotating or fixed meter icon, if desired. In general, however, it would be appropriate to place a particular informative meter in only one meter icon location (either fixed or rotating).

Referring to FIG. 7, to add a rotating meter icon the user would "select" one of the meters listed in the Select Meter box at 320, then press or touch (on a touch-screen display) the "Add" button at reference numeral 362. This operation would then insert the appropriate meter name into the Meter Player box 350, at one of the locations, for example, at 352, 354, or 356. The next rotating meter to be added to status bar 140 would be placed into the first presently empty location (on FIG. 7), which is at reference numeral 352.

More than three (3) meter names can be associated with a single rotating meter icon by using a scroll bar at 360 to access other "empty" locations in the Meter Player box 350 which cannot be viewed at one instant. Since only one meter of a single rotating meter is visible at a given moment in time, however, there is a practical limit as to the number of meter names that should be associated with a single Meter Panel. It is preferred that only three (3) or four (4) meters be included in a single rotating meter, although certainly any number of such rotating meters can be associated in a single rotating meter without departing from the principles of the present invention.

Keeping in mind that it is preferable to limit the maximum number of meters associated in a single rotating meter, it is preferred to add a second rotating meter to the status bar 140 in situations where a large number of informative meters are desired for display on screen 30. Certainly, the entire status bar 140 could be filled with numerous rotating meters, and adjacent rotating meters could be placed at various locations on the status bar, even at the locations 232 and 234 on FIG. 4, if desired by the user.

To remove one of the rotating meter icons from the status bar 140, the user would select one of the meter names in the Meter Player box 350 and then press or touch the "Remove" button at reference numeral 364. If the meter name had earlier been removed from the Select Meter box 320 (if this option had been chosen by the user), then that particular meter name would be reinstated back into the Select Meter box.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A computer system, comprising:

(a) a memory circuit for storage of data;

(b) a display which acts as a graphical user interface; and (c) a processing circuit that is configured to control the flow of data between said memory circuit and said display and the appearance of information upon said display, wherein a meter area in said display is provided to depict one of a plurality of meter symbols representative of a particular informative meter therein for a predetermined time period, whereby the meter symbol displayed in said meter area is automatically rotated between said plurality of meter symbols.

2. The computer system as recited in claim 1, wherein said processing circuit and display are further configured to position said meter area at substantially the same location on said display regardless of which one of the particular informative meters is presently depicted.

3. The computer system as recited in claim 1, wherein said informative meter comprises one of a battery power indicator, signal strength indicator, PC-card indicator, memory usage indicator, clock indicator, interrupt indicator, serial port indicator, keyboard indicator, volume indicator, speaker phone indicator, handset off hook indicator, messaging indicator, handset out of range indicator, PCMCIA slot usage, and infrared connection.

4. The computer system as recited in claim 1, wherein said processing circuit and display are further configured to allow one of said informative meters to receive priority upon a change of status, and to be displayed in a manner within said meter area so as to be more readily observed by a user.

5. The computer system as recited in claim 1, further comprising a second meter area positioned at a different location on said display, under the control of said processing circuit, said second meter area depicting one of a second plurality of meter symbols representative of a particular informative meter therein for a predetermined time period, whereby the meter symbol displayed in said second meter area is automatically rotated between said second plurality of meter symbols.

6. The computer system as recited in claim 1, further comprising a second meter area positioned at a different location on said display, under the control of said processing circuit, said second meter area having a designated informative meter depicted therein at substantially all times.

7. A communications terminal, comprising:
   (a) a telephony circuit;
   (b) a memory circuit for storage of data;
   (c) a display which acts as a graphical user interface; and
   (d) a processing circuit that is configured to control the flow of data between said telephony circuit, said memory circuit, and said display, said processing circuit further controlling the appearance of information upon said display, wherein a meter area in said display is provided to depict one of a plurality of meter symbols representative of a particular informative meter therein for a predetermined time period, whereby the meter symbol displayed in said meter area is automatically rotated between said plurality of meter symbols.

8. The communications terminal as recited in claim 1, wherein said processing circuit and display are further configured to position said meter area at substantially the same location on said display regardless of which one of the particular informative meters is presently depicted.

9. The communications terminal as recited in claim 1, wherein said informative meter comprises a signal strength indicator relating to a relative quantity of signal amplitude received by said telephony circuit.

10. The communications terminal as recited in claim 1, wherein said informative meter comprises one of a battery power indicator, signal strength indicator, PC-card indicator, memory usage indicator, clock indicator, interrupt indicator, serial port indicator, keyboard indicator, volume indicator, speaker phone indicator, handset off hook indicator, messaging indicator, handset out of range indicator, PCMCIA slot usage, and infrared connection.

11. The communications terminal as recited in claim 7, wherein said telephony circuit comprises a cellular telephone that is in communication with said processing circuit, wherein data received by said cellular telephone is displayed on said display.

12. The communications terminal as recited in claim 11, wherein said informative meter comprises a signal strength indicator relating to a relative quantity of signal amplitude received by said cellular telephone.

13. The communications terminal as recited in claim 7, wherein said processing circuit and display are further configured to allow one of said informative meters to receive priority upon a change of status, and to be displayed in a manner on said display so as to more readily be observed by a user.

14. In a computer system having a memory circuit, a processing circuit, and a display, a method of providing a graphical user interface, said method comprising the steps of:
   (a) displaying, under the control of said processing circuit, one of a plurality of meter symbols representative of a particular informative meter within a meter area provided in said display for a predetermined time period; and
   (b) automatically rotating between said plurality of meter symbols displayed in said meter area.

15. The method as recited in claim 14, wherein said meter area is positioned at substantially the same location on said display regardless of which one of the particular informative meters is presently displayed.

16. The method as recited in claim 14, further comprising the step of allowing one of said informative meters to receive priority upon a change of status, and to be displayed in a manner on said display so as to more readily be observed by a user.

17. The method as recited in claim 14, wherein said displayed meter symbol comprises one of a battery power indicator, signal strength indicator, PC-card indicator, memory usage indicator, clock indicator, interrupt indicator, serial port indicator, keyboard indicator, volume indicator, speaker phone indicator, handset off hook indicator, messaging indicator, handset out of range indicator, PCMCIA slot usage, and infrared connection.

18. The method as recited in claim 14, further comprising the steps of:
   (a) displaying within a second meter area provided at a different location on said display, under the control of said processing circuit, a second plurality of meter symbols representative of a particular informative meter; and
   (b) automatically rotating between said second plurality of meter symbols displayed in said second meter area.

19. The method as recited in claim 14, further comprising the step of displaying a second meter area provided at a different location on said display, under the control of said processing circuit, wherein said second meter area has a designated informative meter depicted therein at substantially all times.

20. The method as recited in claim 14, further comprising the step of providing a cellular telephone that is in communication with said processing circuit, wherein data received by said cellular telephone is displayed on said display.

21. In a computer system having a memory circuit, a processing circuit, and a display, a method of providing a graphical user interface, said method comprising the step of: configuring, under the control of said processing circuit, a meter area that, after being activated, displays one of a plurality of meter symbols representative of a particular informative meter therein for a predetermined time period, wherein the meter symbol displayed in said meter area is automatically rotated between said plurality of meter symbols.

22. The method as recited in claim 21, wherein said plurality of informative meters includes at least two of a battery power indicator, signal strength indicator, PC-card indicator, memory usage indicator, clock indicator, interrupt indicator, serial port indicator, keyboard indicator, volume indicator, speaker phone indicator, handset off hook indicator, and messaging indicator.

* * * * *

UNITED STATES PATENT AND TRADEMARK OFFICE
CERTIFICATE OF CORRECTION

PATENT NO. : 6,211,858 B1  
DATED : April 3, 2001  
INVENTOR(S) : Billy G. Moon, Brian Bankler Page 1 of 1

It is certified that error appears in the above-identified patent and that said Letters Patent is hereby corrected as shown below:

Column 9,  
Line 52, claim 8, delete [1] and insert 7.  
Line 57, claim 9, delete [1] and insert 7.  
Line 61, claim 10, delete [1] and insert 7.

Signed and Sealed this

Eighteenth Day of December, 2001

Attest:

Attesting Officer

JAMES E. ROGAN  
*Director of the United States Patent and Trademark Office*